May 1, 1962 A. D. KNAPP ETAL 3,032,753
APPARATUS FOR CONTROLLING THE DEPTH OF ETCHING
Filed May 20, 1958 4 Sheets-Sheet 1
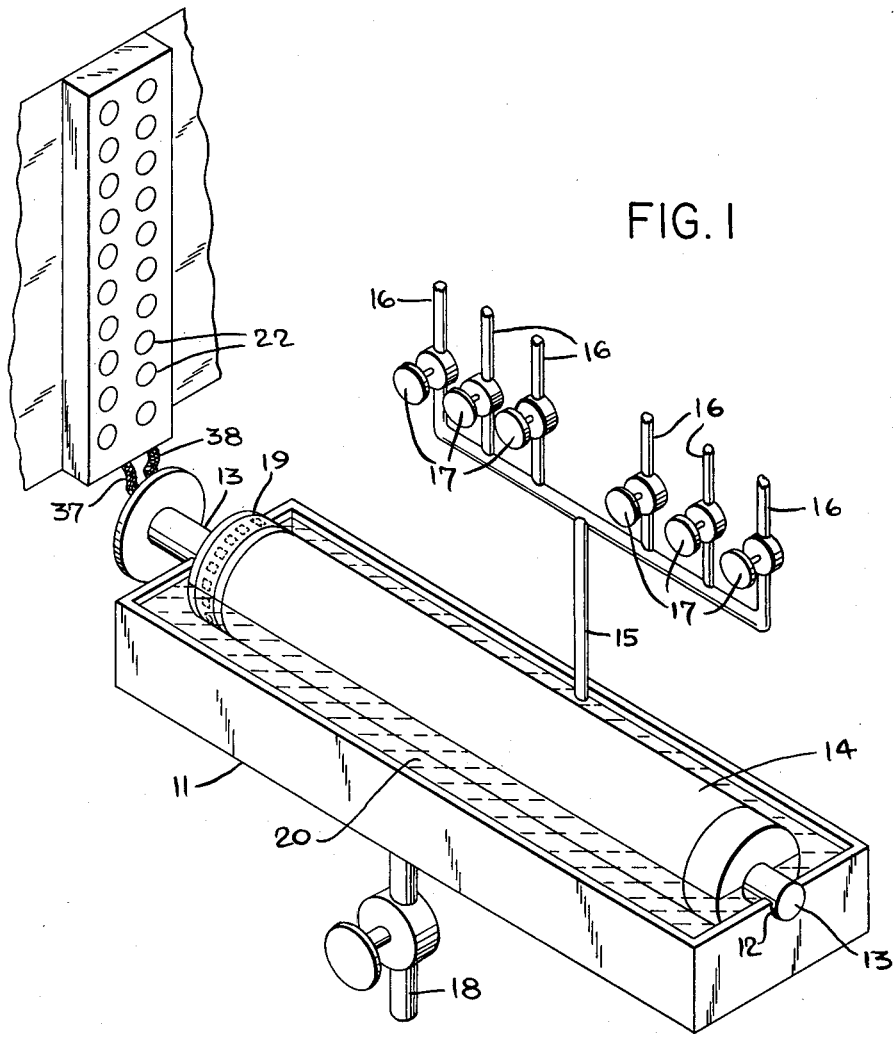
FIG. I
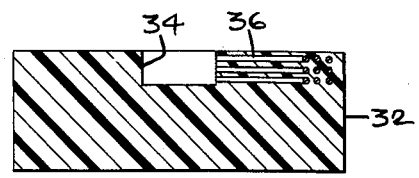
FIG. 6
INVENTORS
ARTHUR D. KNAPP
SANTEF FLABIANO
HUGH U. McGUIRE
BY Klein + Padlon
ATTORNEYS May 1, 1962
A. D. KNAPP ET AL
3,032,753
APPARATUS FOR CONTROLLING THE DEPTH OF ETCHING
Filed May 20, 1958
4 Sheets-Sheet 2
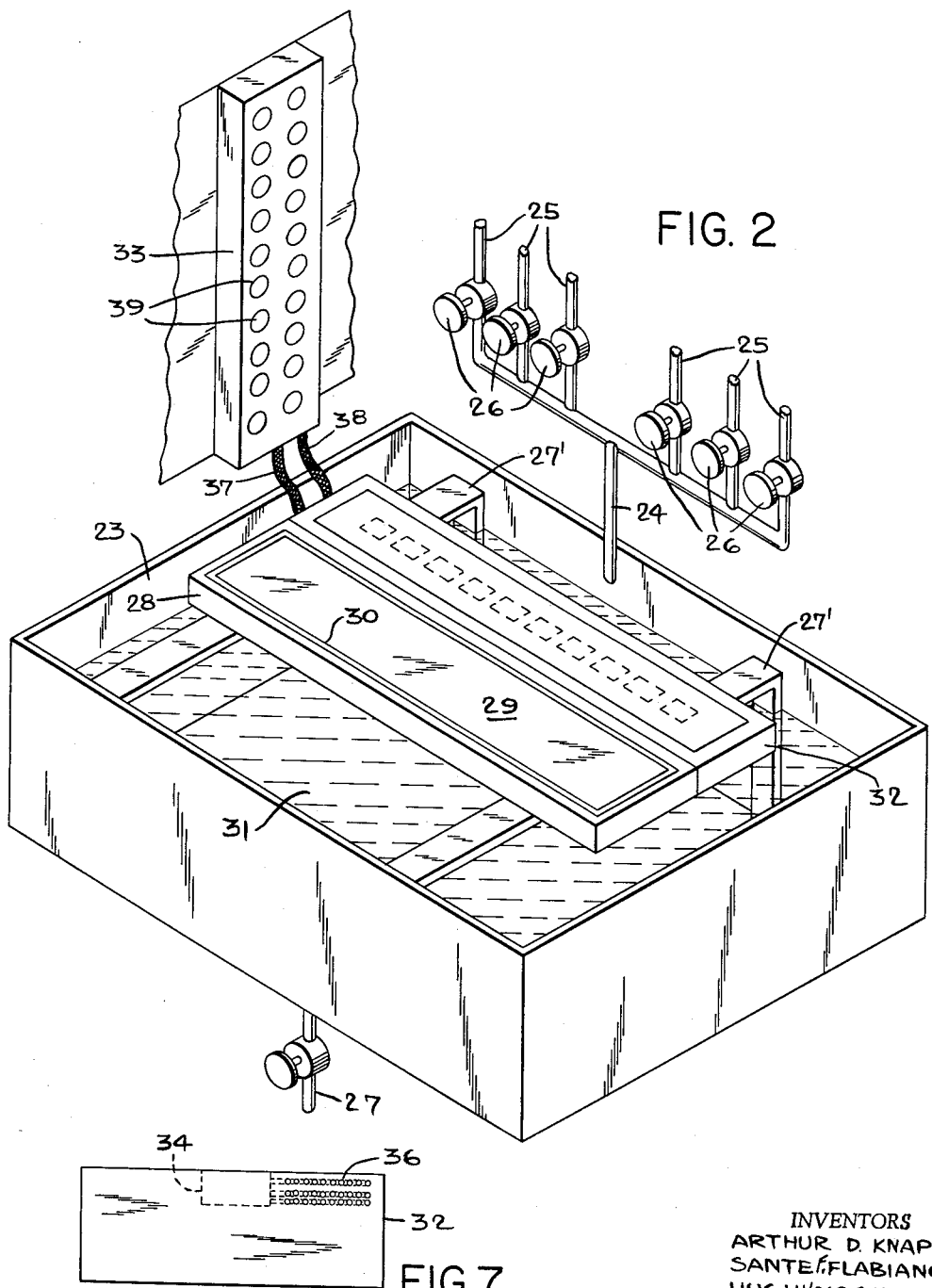
INVENTORS
ARTHUR D. KNAPP
SANTE F. FLABIANO
HUGH V. McGUIRE
BY Klein + Patton
ATTORNEYS

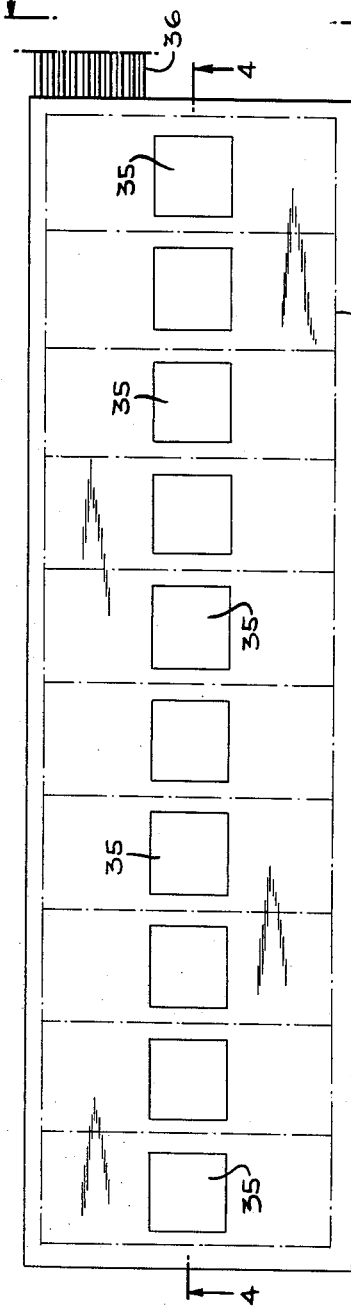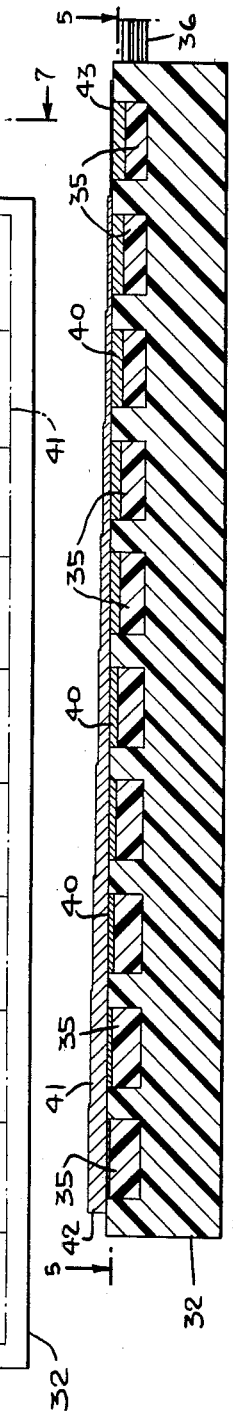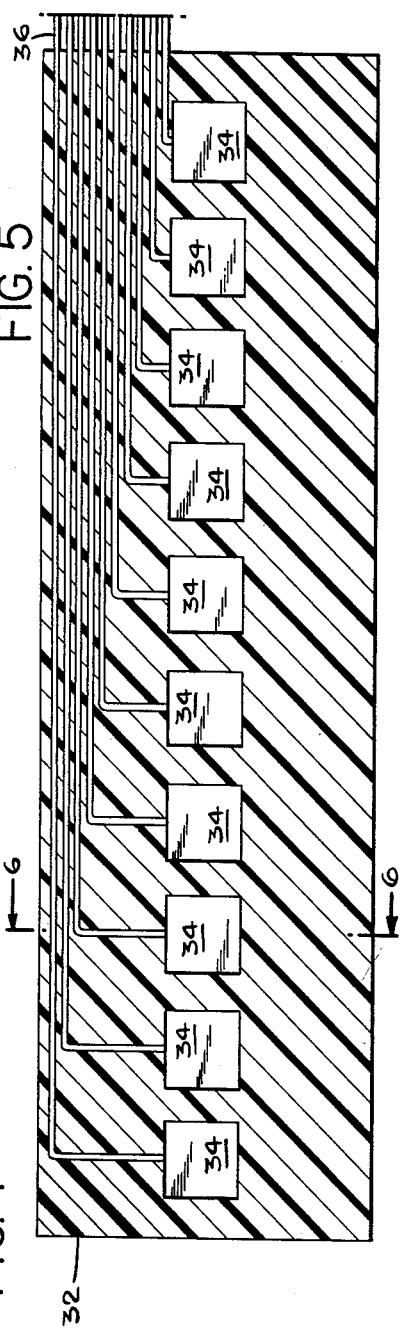

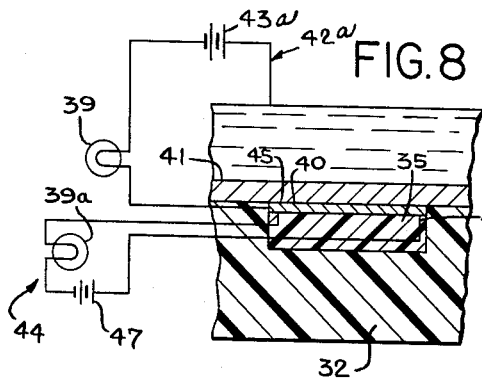
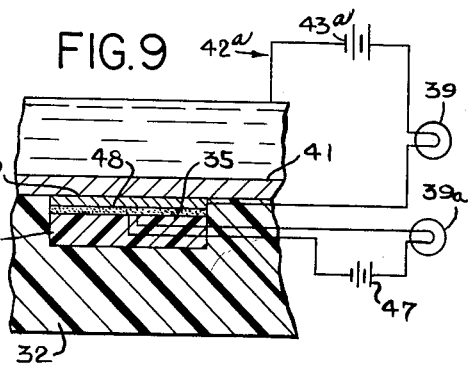
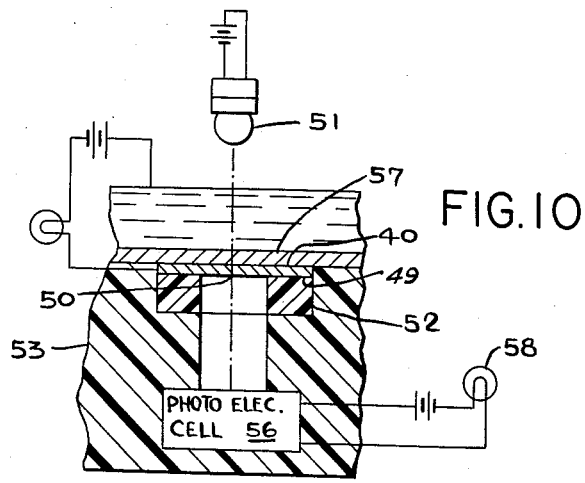
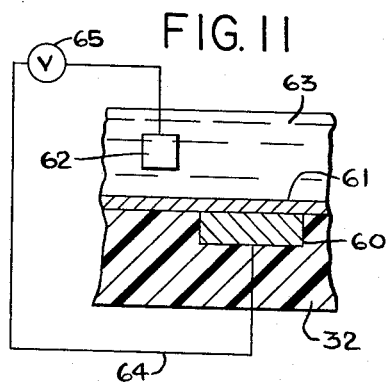
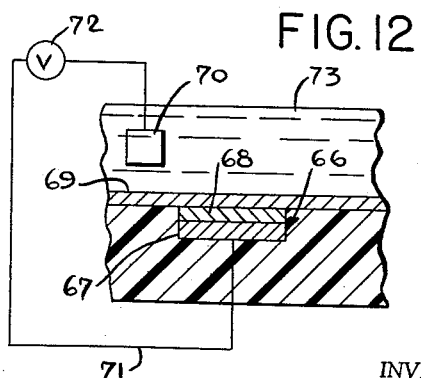

3,032,753
APPARATUS FOR CONTROLLING THE
DEPTH OF ETCHING
Arthur D. Knapp, 99 Weskora Ave., Pleasantville, N.Y.;
Sante J. Flabiano, 8008 35th Ave., Jackson Heights,
N.Y.; and Hugh Vincent McGuire, 31 Ravine Drive,
Mattawan, N.J.
Filed May 20, 1958, Ser. No. 736,544
1 Claim. (Cl. 340—267)

The present invention refers to means for controlling and indicating the depth of etching printing plates and to a method therefor in which such means are minimized. More particularly, this invention refers to means for the signal controlling of the depth of etching of cylinders and plates and the like to specific or desired depths and to a method of detecting the depth of etching thereof in gravure engravings and the like.

At the present time when a plate or surface is to be etched, the resist or bichromate gelatin film on which a photographic image has been imposed by exposure to arc light through a photographic positive, whereby such gelatin with said image is placed on the cylinder or plate to be etched, and the etching operation using a solution such as ferric chloride, sulfuric acid, hydrochloric acid or nitric acid or the like is applied manually by swabbing the cylinder or plate with the etching solution. In the alternative, the cylinder may be revolved in an etching bath either manually, mechanically or electrically. Those parts of the plate or cylinder which are not to be etched are protectively coated with an impervious substance, such as an asphalt solution or the like which is not subject to the action of the etching material. In such operations, the skill of the operator is exceedingly important, since overetching or underetching of the metal surface may spoil the plate or cylinder, thereby incurring a loss of considerable sums of money. It is important therefore, that the etching of the copper or metal surfaced cylinder or plate in a pattern of shallow and deep indentures conform to the highlights and shadows in the original photograph or art work.

In the gravure industry, for example, it has been customary, once the bichromate gelatin image has been applied on a surface of a metal plate or a cylinder, to etch through the gelatin to bring out the various patterns of shallow and deep indentations conforming to the highlights and shadows in the original artwork, photograph, etc. In this etching process, all of the necessary skills of the photographer, retoucher, layout man, printer and developer are brought to a culmination. Any deficiencies in densities must be minimized by the etcher's skill and ability.

In the etching operation in the case of a plate, the etching medium used may be applied manually by the operator by swabbing or rubbing such etching medium with a soaked sponge or cloth or absorbent cotton which he passes over the copper or metal surface with the resist thereon. In the case of a cylinder this is rotated in an etching bath. Resist means the gelatin coating laid over the metal surface. In addition, a resist may take the form of enamels, ink surfaces, etc.

This procedure must be carefully done since there may be over or under etching of the metal. The operator must during the etching operation frequently check the metal surface being etched visually, using a powerful magnifying glass to see that he has obtained the correct tone or depth on the cylinder or plate by means of the etching process.

In many instances, however, there may be overetching with the result that the cylinder or plate when used will not show the proper printed tones on the finally printed product. This then necessitates a whole new series of steps in producing a new plate or cylinder having the proper tone or depth. Such steps are not only expensive but time consuming incurring considerable use of man hours at a very high rate of pay.

In order to avoid the above disadvantages, we have by our invention provided means and a method whereby the depth of etching on a metal plate or cylinder is under control during the etching operation.

It is therefore an object of this invention to provide means for controlling the depth of etching of gravure plates or cylinders and the like, using depth control signalling means.

Another object of the present invention is to provide controlling means for indicating the depth and completion of an operation during the etching process of a cylinder or plate.

One further object of the present invention is to provide a method for quickly, accurately indicating the depth to which an etch has progressed, thereby controlling the etching process in gravure and allied work by utilizing certain depth factors on a standard board used as the means of control.

A still further object of the present invention is to provide control means for etching operation, said control means being in connection with signalling means.

A more specific object of the present operation is to provide etching control and signalling means comprising signalling means which are in circuit connection with the etching device whereby there are provided indicators and comparators to demonstrate the depth of the etching in a gravure or like printing plate or cylinder.

A more detailed object of the present invention is to provide replaceable, depth control means in etching a metal surface, wherein the means are disposed as a comparator having a series of surface depths of a resist layer laminated to a series of metal strips of different thicknesses with or without an underlying spaced metal strip, each of the strips being in electrical connection with indicating means to signal the completion of etching at certain desired depths, and to a method of etching control, said depth control means being subjected to the action of etching fluid used simultaneously to etch the plate or cylinder, or any surface to be etched under control.

A more specific object of the present invention is to provide a novel method of controlling the depth etching of a metal surface whether flat or circular using at least one electrolytic or electro conductor means, which when dissolved brings about the indication of the completion of the etching of the surface to a desired depth.

A still further object of the present invention is to provide means for use in connection with material to be etched, said means including at least one electrical circuit with indicator means and soluble electro conducting means used in the circuit which last means being adapted to bring about a cessation of the etching process in rotogravure and like work.

Another object of the present invention is to provide readily replaceable etching indicating means which may function in such manner that it may be used with an indefinite part of surfaces without any replacement of parts.

Other advantageous features and objects of this invention will become apparent from the hereinfollowing detailed description, taken in conjunction with the accompanying drawings, in which:

FIG. 1 is a perspective view of an embodiment of the invention, showing its application to a cylindrical metal surface, FIG. 2 is another modification of the embodiment, showing the use of the invention on a flat type of material to be etched, FIG. 3 is a plan schematic view showing the arrangement of a portion of the embodiment shown in FIGS. 1 and 2, FIG. 4 is a sectional view taken on lines 4—4 of FIG. 3 showing an exaggerated thickness of certain portions of the embodiments, FIG. 5 is a sectional view taken on lines 5—5 of FIG. 4, FIG. 6 is a detailed view taken on lines 6—6 of FIG. 5, showing a conduit for electrical connection, FIG. 7 is an end view taken on lines 7—7 of FIG. 3, FIG. 8 is a fragmental, sectional view, enlarged, showing the circuit connection of a portion of the embodiment, FIG. 9 is a fragmental, sectional view of a modification of the embodiment in FIG. 8, FIG. 10 is still another modification of the embodiments shown in FIGS. 8 and 9, FIG. 11 is a detail, fragmental sectional view of another modification of the coins and electrical circuit therefor, and FIG. 12 is a detail sectional view of a still further modification of the embodiment of FIG. 8 of the invention.

Referring now to the drawings wherein like reference numerals refer to like parts throughout, it will be noted that there is provided according to the invention, a device or tank 11 which is provided with suitable means or bearings 12 for supporting shaft 13 of a cylinder 14 adapted to fit into the tank 11. Said tank 11, furthermore, is provided with an inlet conduit or pipe 15 to which are connected several branch pipes 16 each provided with control valves 17 for the influx into the tank 11 of etching fluids of different types or specific gravities or Bé and used to etch the surface of the cylinder when immersed in the fluid in the tank. Different etching fluids used in accordance with this invention may be ferric chloride, hydrochloric acid, nitric or sulfuric acid or any other suitable material adapted to dissolve a metal surface. As shown, said tank 11 is also provided with an outlet pipe 18 for drawing off the etching fluid 20 after it has been used or spent, or to permit the tank to be filled with another etching fluid after the first one has been used or to permit the tank to be filled with an etching fluid of a different Bé, or with water for washing off the fluid from the cylinder.

Said cylinder 14 may be automatically operated or it may be manually rotated within desired limits on the tank and in the etching fluid. In the etching process the metal cylinder is coated with a resist, that is a film of bichromate gelatin, which has been exposed to a photographic positive and which has different gradations of tone, depth or texture, depending on the depth of intensity desired in the final material which is to be printed from the etched cylinder.

To control the depth of this etching of the copper film on the cylinder and to know when the etching operation is to be discontinued there is provided at one end of the cylinder an annular member or collar 19, which for purposes herein may be considered a comparator, and is exposed to the action of the etching fluid 20 in tank 11, and is attached to the cylinder in any suitable manner. This collar fits snugly on the cylinder.

Said collar 19 is made of any suitable electrically non conducting material and is provided with a series of removable plugs, blocks of "coins," each of which is in electrical connection with a plurality of signals or lamps 22 as will be hereinafter more fully described. Said collar is readily removable from the cylinder and is kept in fixed position on the cylinder in any suitable manner.

In FIG. 2 and in the succeeding figures there is shown how the invention is applied to flat plate etching. It is to be understood that the detailed description of the invention applied to flat plate etching applies equally as well to the etching of cylinders as initially described hereinabove with respect to the embodiment shown in FIG. 1.

As shown in FIG. 2 there is provided the tank 23 having a master feed pipe 24 with its branch feeder pipes 25 and their respective control valves 26 and the outlet pipe 27 which permit pouring of fluid into and from tank 23. As indicated hereinabove, the different branch feeder pipes are used to supply etching fluids of different types or specific gravities or Bé, depending on the specific purpose desired of the etching fluid.

Said tank 23 is provided with a bracket or support frame 27' on which rests a non-etchable plate 28 which has a copper or other metal film 29 to be etched typical in gravure and like work. Said film is held onto the plate by means of asphaltum film or strip 30 acting as an adhesive along the marginal edges of the metal film to be etched. The asphalt film seals the edges of the metal film and prevents the etching fluid 31 in the tank from seeping underneath the metal film. It is to be noted that said plate 28 may be of plastic or glass or any other suitable material.

Adjacent plate 28 or forming part of said plate 28 is a control etching device 32 which as shown rests on bracket 27' and is subject to the same action of the etching fluid 31 as is plate 28. The details of construction of this device 32 and its connecting signalling panel 33 are more fully described hereinafter as applied to FIGS. 3 to 8 inclusive.

As shown in the drawings it will be noted that the signalling panel and the control etching device 32 together form a comparator. Said control device 32 is an electrically non-conductive sheet or dielectric plate made preferably of plastic material containing a plurality of openings 34 for correspondingly accommodating therein removable or replaceable plugs, coins or slugs 35. It is to be noted that said control etching device 32, furthermore, has a plurality of separate electrical circuits 36, usually two for each of the openings 34 and the slugs 35, which in turn are connected by means of cables 37 and 38 respectively, carrying said circuits to the connecting panel or indicator board 33. Said panel 33 is provided with a series of indicators or lamps 39 and with a source of electricity, not shown. During the etching operation, said lamps 39 are illuminated because of the continuous circuit, until the etching fluid breaks the circuit as will be hereinafter more fully described. It is to be noted that said circuits or electrical means are molded inside the control etching device 32 and are continuously used, whereas the slugs 35 are replaceable. The details of the arrangement of the electrical circuit lines 36 in said control etching device 32 are more clearly shown in FIGS. 5, 6, and 7 of the drawings. It is to be noted that in some cases there is a break and in other cases there is a make of the circuit in connection with the signal means in the present invention.

With reference to the slugs 35 it will be noted as shown in FIG. 4 that each of the slugs carries a metal conductor fuse-like strip or coating 40 as shown in the cross sectional view in FIG. 4 and forms part of the circuit as shown. Ordinarily, the strip 40 is of copper and is very thin on the slug, the thinness ranging anywhere from one micron up to 200 or more, depending on the surface to be etched, the depth of which is to be controlled. In other words, each slug 35 will have a strip or coating 40 of definite thickness, but each strip or coating progressively increases in thickness on each slug or the arrangement may be in reverse order from that shown in FIG. 4. In other words as the thickness of the resist over each slug increases, the depth or thickness of each corresponding copper strip decreases. It is to be noted that the coating may be applied by any suitable means as by electro chemical deposition.

It is to be noted that each slug once placed into the opening 34 is then sealed with any suitable sealing material, such as asphaltum, so as to prevent the etching fluids from seeping into the opening from the sides of the slug. Also, each coating completes the circuit of each respective conduit 36 in the device 32.

Superimposed above said slugs and covering the fuse like strip or coating 40 in each slug, there is provided a lamination or layer 41 of resist material also known as bichromate gelatin.. It is to be further noted as hereinabove indicated, that the layer of the resist 41 varies in thickness or depth from one end as at 42 to the other end at 43 of the device 32 so that the thinner the copper or metal film strip on the plug 35, the thicker the resist overlaying said strip. As shown in FIG. 4 it will be noted that as each strip on each plug is thicker, the thinner is the coating of the resist 41.

The circuit connection between the indicators 39 and each fuselike strip or coating 40 is more clearly shown in the fragmental view in FIG. 8. It will be noted that the thickness of the metal and of the resist shown in the drawings are greatly exaggerated for purposes of illustration, it being borne in mind as heretofore stated that the thickness of these films or strips is exceedingly small within the range of microns or thousandths of an inch.

As shown in FIG. 8 indicating the schematic connection of the electrical circuits there are provided two circuits. One set 42a of circuits is in connection with the etching fluid which is an electrical conductor, a source of electrical energy 43a and a lamp 39 forming part of said circuit. The remaining portion of said circuit 42a, it will be noted, is in connection with the surface of the strip or film 40. The other set 44 of circuits it will be noted, is in connection with the bottom portion of the fuse strip or film 40 in the slug 35 and at both ends 45 and 46 respectively of the slug, 35. There is also provided a signal unit or lamp 39a and a source 47 of electrical energy for said circuit 44.

As shown in FIG. 9, it will be noted that there is a slight modification of the embodiment shown in FIG. 8 and that there is provided an intermediate layer 48 of a water absorbing material such as gelatin, glue or any other substance which can be readily dissolved by the etching fluid so as to continue from one circuit namely the first, to the second circuit as shown in FIG. 9 during the etching operation.

In FIG. 10, there is shown a further modification in detail of the device whereby the control is effected by means of a photo electric cell 51. The meal strip or coating 40 is during etching dissolved forming an opening 50 therein whereby the rays from a light source 51 pass through the slug 52 onto an electric eye or photo electric cell 56. The slug 52 and the device 53 are each made of material such as glass so that light rays 54 pass therethrough. Said electric eye 56 as shown may be encased in device 53 so that when the etching fluid has dissolved the resist 57 and the film 49, it cannot affect the photoelectric cell 56. The photoelectric cell then will affect indicator light 58 to signal the completion of this etching operation.

It will be noted that in FIG. 11 showing a modification of the circuit and component parts in the comparator, there is used an additional coin 60 which in this case is made of zinc or some electroconductor other than the copper strip above herein indicated. These coins 60 are covered by a resist or gelatin 61 having the same gelatin thickness as the corresponding copper coin. A piece of pure copper 62 is suspended in the etching solution 63, the size and thickness of the copper piece corresponding with the size and piece of gelatin 61 covering coin 60 inserted in the non conductor base or comparator device 32.

From the zinc coin 60 there extends an electrical line 64 connecting with metal piece 62. A voltmeter 65 is in the line 64, so that when the acid or etching solution 63 has penetrated the gelatin 61, a current will be set up between the different metals and the voltmeter will so indicate the change, thereby warning the operator of the beginning of the etching action. This circuit and connection indicate only the start of the etch by showing that the gelatin has been penetrated. FIG. 11 is used to show the beginning of the etch and does so by indicating the penetration of the gelatin and can be used in conjunction with FIG. 12 to contain the same properties as the embodiments shown in FIGS. 9 and 10. It is to be noted furthermore, that the embodiment shown in FIG. 12 can be operated without FIG. 11 and vice versa.

In FIG. 12 there is shown another modification in which the slug or coin 66 shows a single zinc strip or piece 67 with a copper film or plating 68. Coin 66, it will be noted is a bimetal covered by gelatin or resist 69. The zinc is in connection with a copper strip or piece 70 by means of circuit 71 which is provided with voltmeter 72. It is to be noted a slug or coin 66 is provided for each different thickness of the copper film in the coin.

During operation of the invention, as the etching solution 73 penetrates the gelatin and then the copper in the coin, it then comes into contact with the zinc 67. The action of the etching solution moving from one metal to another, i.e. copper 68 to zinc will be indicated on the voltmeter, thereby indicating or signalling the completion of the etching operation.

In the operation of the device, referring to the accompanying drawings, etching fluid such as ferric chloride, hydrochloric acid, nitric acid, sulfuric acid or any other type of etching fluid is brought into contact with the surface on the cylinder 14 and the collar 19 by immersing in the etching bath or by pouring or swabbing the fluid on the control etching device 32 and the metal surface 29 of plate 28. This utilization of the etching fluid is done simultaneously so that there will be no error in the application of the etching fluid to the surface to be etched and to the comparators which are made up by the slugs, the metal surface and the resist and electrical circuits. As the etching process proceeds, the gelatin or resist layer is being slowly and carefully dissolved while the lights on the board 33 are illuminated due to the continuity of the circuit. With the etching operation proceeding but under the careful control of the operator, the etching fluid will then contact the metal fuse like strip or film 40 dissolving the same. It should be noted that dissolving of metal strips is completed at the same time, this factor being controlled by the proper resist thickness. In lieu thereof, it may be desirable to use another type of etching fluid.

The etching operation is then continued so that all of the metal film or strip 40 is etched on the slug and the second circuit 44 is broken so that the light in lamp 21a will then be extinguished due to the break in the circuit.

It is to be noted that the non-conductive sheet 32 must be perfectly flat and able to accept transfer material such as carbon tissue, Rotofilm, and others used in photoengraving, and that said sheet 32 must contain a number of openings of accurate dimensions which can be readily and safely sealed off from the effects of the etching fluid into which the coins or slugs are inserted. At the top and bottom of each opening, there is provided a metal strip, such metal strips being on the top and bottom of the slug 35 and which in turn, are electrically connected through the non-conductive sheet to terminals on the back of the sheet, to form separate and independent circuits. The slugs having the metal strip fit exactly into the openings 34. The metal deposited on each coins is of different known thickness as hereinabove indicated starting at approximately one micron up to any desired thickness in the case of etching a metal surface and in the case of gravure and like work up to 200 microns. The coins 35 with the copper film or strips 40 are placed in the openings in the order of their thickness, thereby forming a conductive line from one terminal on the back of the non-conductive sheet through the copper strip on the coin to the other terminal on the back of the sheet 32. If these terminals are then connected to an electrical circuit as shown herein, it will then be noted that the metal strip will act as a fuse and break the circuit.

All seams are now completely sealed and the non-conductive sheet fitted into a control box located in the etching machine or tray, or on a wheel next to the cylinder, or forming a part thereof. The box must be positioned so as to receive the identical etching treatment as the plate or cylinder being etched. In such case when the circuit is broken the etching is discontinued.

From our invention as described above, it will be noted that as the etching proceeds, it can be readily seen that when the required depth is obtained in any of the areas on the plate or cylinders the respective circuit approximating or reaching that depth will be broken and cause a signal to be given to the operator. The signal is extinction of the light bulb 21 or 39 on the panel board. The invention can also be used to carry signals to a mechanical etching machine to change etching or discontinue the same when necessary as well as to start and stop the etching by controlling the operation of various pumps, tray moving, and cylinder manipulation.

It is to be noted that the above description applies to control etching where a resist is used over the metal film of the slugs. In those instances where no resist or carbon tissue is used then only one circuit is required. In many instances, in etching operations such is the case thereby making the operation of shorter duration.

In the circuits shown in FIGS. 9, 11 and 12 it is to be noted that the etching of the metal surface and the tissue there is a completion instead of breaking of the circuit.

This depth control device herein described therefore indicates exactly what occurs during the etching process and allows proper adjustments in procedure to be made either by manual or mechanical means.

It is apparent from the above described and illustrated device and means and a method, that etching to any depth of any surface can be accomplished.

Also, it is possible to utilize isotopes in accordance with the present invention wherein a solution having isotopes will etch and wash out the resist and when the isotopes in the etching solution strike the underlying metal, a Geiger counter or other indicating means disposed underneath the metal film in the slug will become activated thus signalling the completion of the etching operation.

While preferred embodiments of this invention have been illustrated and described, it is to be noted that modifications as to form, arrangement of parts and use of materials may be made without departing from the spirit and scope of this invention as claimed.

We claim:

A device for controlling the depth of etching of a surface and adapted to be used simultaneously with the etching of said surface, comprising a dielectric member having a plurality of openings therein and a series of electroconduits, removable replaceable means for said openings having electro conductive means, indicator means in electrical connection with the conduits and the electro conductive means and resist means for each of said removable means superimposed on the same adapted to be etched; the thickness of the resist means being different from that of the underlying electroconductive means, said removable means being sealable, and each succeeding electroconductive means having a metal layer of the same type as the surface to be etched in connection with the respective conduit in the dielectric member and varies in thickness with the other and the thickness of the resist coating means varies in thickness with the succeeding one in the member and the combined thickness of the resist layer and metal layer in each removable means is uniform throughout the length of the member, and the etching time of each slug coincides with the relative thickness of the resist on each removable means.

References Cited in the file of this patent

UNITED STATES PATENTS

| | | |
|---|---|---|
| 2,662,203 | Seely | Dec. 8, 1953 |
| 2,762,035 | Triman | Sept. 4, 1956 |
| 2,762,036 | Triman | Sept. 4, 1956 |